Feb. 21, 1967  J. P. BREMENKAMP  3,304,590
IRRIGATION APPARATUS
Filed June 4, 1965
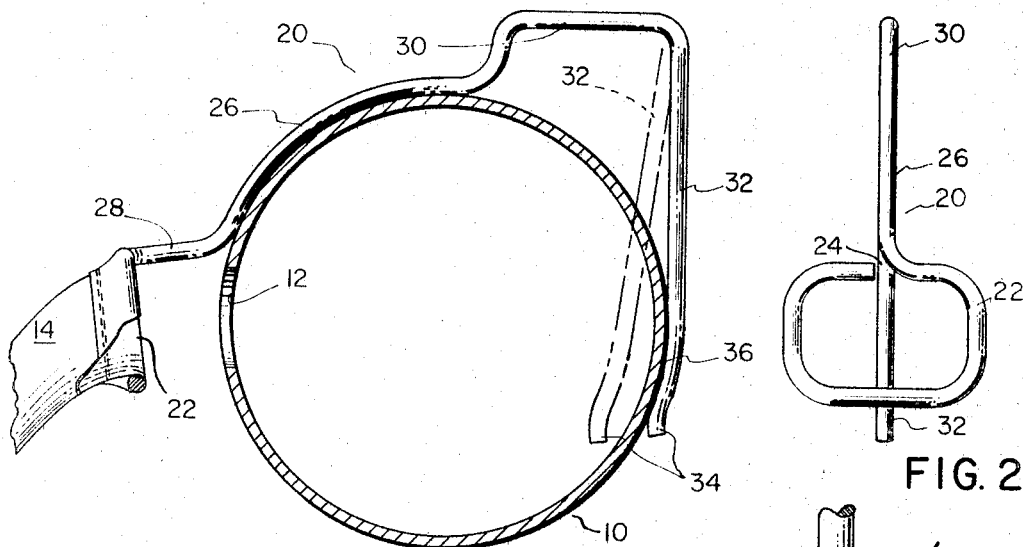
FIG. 1
FIG. 2
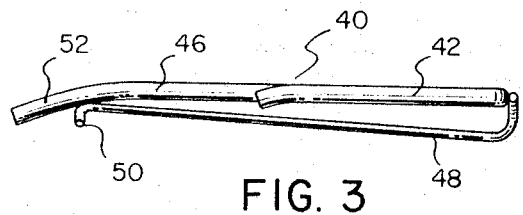
FIG. 3
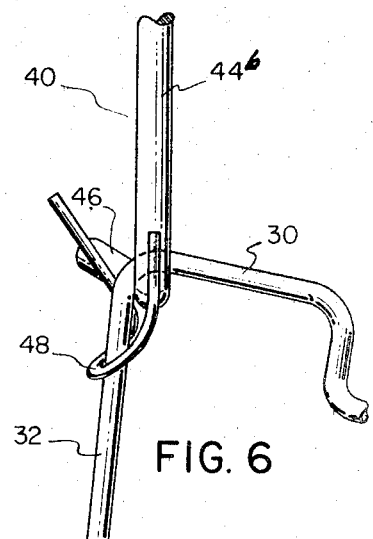
FIG. 6
FIG. 5
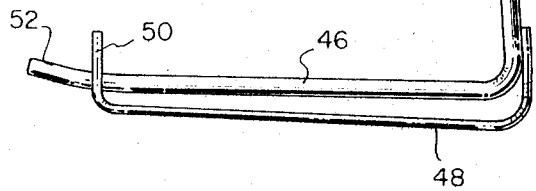
FIG. 4
INVENTOR.
JOHN P. BREMENKAMP
BY Duane C. Bowen
ATTORNEY United States Patent Office 3,304,590
Patented Feb. 21, 1967

3,304,590
IRRIGATION APPARATUS
John P. Bremenkamp, Box 511, Colby, Kans. 67701
Filed June 4, 1965, Ser. No. 461,242
1 Claim. (Cl. 24—81)

My invention concerns an improved irrigation sock clamp for positioning an irrigation sock relative to an irrigation pipe having an opening to be covered by this sock. The apparatus is adapted for quick installation and removal.

The invention concerns irrigation of the type using gated irrigation pipe. In this type of irrigation, the pipe may be laid transversely of furrows in the field to be irrigated and the gated openings may be generally aligned with the furrows. The pipe has a series of openings that are closeable by sliding gates or have nozzles adjustable to adjust water flow.

Water may be pumped into the irrigation pipe with some pressure and velocity. Recently it has become a practice to cover the openings of the pipe with irrigation socks to better distribute water into furrows and to avoid erosion by a direct contact of the stream, issuing from the opening, with the ground. The irrigation sock is a fabric tube of the type that has had various usages in irrigational watering.

Whereas the use of irrigation socks has proven advantageous, it has also involved some problems primarily in terms of labor. It is not practical to provide an irrigation sock for each opening in a gated pipe and to permanently install the same, for various reasons such as the cost of a large number of socks and deterioration of the same by moisture and contact with the ground if they were left permanently rather than merely used and then stored between usages. At least the present practice is to temporarily secure the socks and to move them from location to location and to store them between uses.

The trend in farming is clear that farmers are taking care of larger farms, use larger machines to minimize labor, and must look at every aspect of their operations to minimize labor and particularly in the seasons when work peaks. The use of irrigation socks which must be installed and removed involves an amount of labor which the farmer must seriously consider as he must consider other miscellaneous time consuming operations. He needs to reduce the time spent on installation and removed to a fair minimum. It is one of the objectives of my invention to minimize on labor in installation and removal of irrigation socks and the means of accomplishing the same will be described hereinafter.

There are certain desirable characteristics relating to the installation of irrigation socks on irrigation pipes besides questions of fast installation and removal:

The clamp should be adapted for pipe having either gate or nozzles. Depending on pressure and velocity, water may emerge from openings directly laterally or at some angle and the irrigation sock should be supported in a manner to receive water even if it emerges at an angle to normal disposition. The irrigation sock should be held in position to drape to the ground with minimum folding. The clamp should be adapted for ready replacement of irrigation socks when it is desirable to do the same for cleaning or replacement. The clamp should be secure in engagement while being readily installed. It is desirable to be able to install the irrigation sock and its clamp on the pipe in one fast movement and to remove the same in the same manner. It is an objective of my invention to work solutions to the above problems and to provide such desirable characteristics.

In accordance with the invention the improved irrigation sock clamp is formed from a resilient metal rod member. The resilient rod is formed with an arcuate portion generally conforming to the circumferential configuration of the irrigation pipe on which it is to be applied. The arcuate portion is bent outwardly from the pipe in an extension portion which terminates in a single open turn oblong ring portion. This ring portion is located in spaced relationship to the opening in the irrigation pipe and receives and supports the irrigation sock which is positioned on the ring portion and anchored there. The ring portion is disposed at an angle to the vertical to prevent the irrigation sock from folding over in crimped relationship when positioned on the ring. A handle portion extends upwardly from the other end of the arcuate portion of the resilient rod, and a leg portion depends from the handle to a point on the irrigation pipe generally diametrically opposite to the oblong ring portion. The lower end of the leg portion terminates in a tip bent outwardly from the irrigation pipe surface in order that the leg portion will slide readily over the pipe surface in the installation process.

Other features and advantages and objectives of my invention will appear from the following description, with reference to the drawings, in which:

FIGURE 1 is a side view of an irrigation sock and clamp on a pipe, partly in section, with a leg of the clamp shown in position before installation in dotted lines.

FIGURE 2 is an end view of the clamp.

FIGURES 3, 4, and 5 are, respectively, top views, side view and end view of means involved in the removal of a clamp.

FIGURE 6 is an enlarged, partial end view showing a clamp engaged by the means for removal thereof.

FIGURE 1 shows in cross-section an irrigation pipe 10 which commonly is of six, eight, or ten inch diameter. At spaced intervals therealong are openings 12 which may vary from, for example, a 1½" round opening to a 2 x 3 inch oblong opening. As above indicated, in some pipes these openings are closed by sliding gates and in other pipes nozzles are installed which may be opened and closed. The pipe is generally described as gated irrigation pipe.

The irrigation sock to be installed on the pipe is shown at 14 and may be of canvas, nylon or other fabric, may have its far end (not shown) opened or closed, and will be relatively pervious to water so that water entering sock 14 will emit at at least the maximum rate of entry.

Clamp 20 has a ring (supporting sock 14) which has several characteristics. First, it is disposed a sufficient distance from opening 12 so that there will be room for a nozzle structure on opening 12 if used. Second, ring 22 is at an angle to the vertical (tipped toward the pipe as it extends downwardly) thereby to support sock 14 in its draping to the ground with a minimum folding. Third, as shown in FIGURE 2, ring 22 is formed with a single loop, open at 24. Sock 14 may be hemmed and is readily installed by threading of the open loop in the hem, and likewise as easily removed. Fourth, ring 22 is horizontally elongated in oblong disposition. As before indicated, depending on pressures and velocities in pipe 10, water may emerge at an angle to normal. By having ring 22 oblong and irrigation sock 14 held at its near end in oblong disposition, water will be received at the various angles to normal (in a horizontal plane). The importance of this will be understood as the whole purpose of the irrigation sock is to contain water and the extent this purpose is defeated, the apparatus is useless.

The purpose of an irrigation sock is partly to guide water into furrows, to the extent the gate is aligned with rows instead of furrows, to avoid washing out rows or to have to use shovel work to guide the water into the misaligned furrow. Some prior clamps fastened completely around pipes requiring a gap in the soil under the pipe. Other clamps have been fastened inside the gate itself requiring getting on knees and getting wet in the process of placement and removal. My clamp avoids complete encirclement of the pipe and avoids fastening in a gate or nozzle wherein removal is relatively laborious and low stooping or kneeling is required.

Clamp 20 may be made of ¼" cold rolled steel rod and it will have some resiliency for purposes of clamping on a pipe. The clamp has an arcuate portion 26 and an extension 28 of about an inch to an inch and a half leading to ring 22, the extension being for the purpose already set forth of leaving room for a gate, nipple, nozzle or the like and of providing room for the hand in operating such mechanism. The portion 26 may be, preferably, semicircular and match the diameter of the pipe on which it is used, or portion 26 instead may be just arcuate and roughly fit several size pipes. As before discussed, it is desirable the clamp go on the pipe in one swift movement and to the extent portion 26 conforms to the pipe there is less chance of twisting of the clamp during installation and a waste of movement. A handle portion 30 upwardly extends and then extends horizontally or rearwardly from the semicircular portion 26. Handle 30 of course is for purposes of grasping the same during clamp installation and is also useful in clamp removal as will be reviewed below.

A straight leg portion 32 depends from and extends abruptly at about right angles from handle 30 and preferably extends at least to a point diametrically opposite to ring 14 and preferably somewhat past this point so there will be quite positive gripping of the pipe. As indicated in FIGURE 1, leg 32 is sprung from the dotted line inner position to the outer position (in full lines) while being installed. The end 34 of leg 32 is outwardly bent providing a camming surface whereby as the clamp is pushed down into place the end cams along the surface of the pipe for reducing surface drag and minimizing damage to the surface of the pipe. Although the rest of leg portion 32 is straight, preferably the end portion of leg 32 is given an ogee bend providing a curvature at 36 conforming generally to the curvature of the pipe, giving a more positive gripping than with a straight section. By the construction of the clamp as described and shown, a man with a little practice can install the clamp on the pipe with one swift downward push.

Referring to FIGURES 3, 4, 5 and 6, the handle member 40 is shown formed of, for example, ½" rod or larger tubing. Handle 40 includes an upper leg 42 with a downturned end 44a adapted for manual gripping. Descending from upper leg 42 is a depending connecting portion 44b and at the bottom is a lower leg 46 longer than upper leg 42 and generally parallel thereto.

Attached to portion 44b as by welding is a resilient rod 48, of ¼ to ½" rod, for example, that extends parallel to lower leg 46 below and to one side, thereof.

The purpose of handle member 40 is the rapid removal of clamp 20. With the use of this handle a man can with one hand remove 40 to 50 socks without much if any stooping and can carry them to their new location or storage the same as he would carry a suitcase. The extra length provided by the handle in removal, as opposed to installation, minimizes or eliminates any stooping. Lower leg 46 is inserted in a handle portion 30 of a clamp and the handle portion 30 is kept thereby with leg portion 32 of the clamp kept by bar 48 (which acts as a keeper). In other words, as demonstrated in FIGURE 6, lower leg 46 is inserted through handle 30 of clamp 20 in a manner so that straight depending leg 32 (extending from handle portion 30 at about right angles) presses against keeper bar 48 (it will be understood that the principal weight of the clamp together with irrigation sock 14 is heavy on the right hand side of clamp 30 in the view in FIGURE 6 so that the leg 32 will bear against keeper 48). If it were not for the keeper 48 during removal and transportation of the number of clamps they would tend to bounce or jiggle off handle 40. Leg 46 and keeper 48 retain the clamps therebetween and the bearing of legs 32 against the keeper tends to prevent the clamps from jiggling, sliding or bouncing off.

The ends of lower leg 46 and keeper 48 are formed in a manner so that clamp 30 may wedge them apart (if there is not enough room left between them for free passage) in picking up clamps on the handle. Further, the ends of leg 46 and keeper 48 are formed so that they may be interlocked to latch one or a multiplicity of clamps therebetween. The forming of the ends for locking includes an upstanding end 50 on keeper 48 and a turning 52 on lower leg 46, whereby in locking upstanding end 50 is brought to the opposite side of leg 46 than as viewed in the drawings. It will be understood that clamp 30 may be locked on handle 40 not only for transportation from one irrigation pipe to another but also to be hung in a storage shed or the like between uses.

The labor saving and other desirable features of my invention in the installation and removal of an irrigation sock relative to an irrigation pipe will be understood from the above description.

Having thus described my invention, I do not want to be understood as limiting myself to the precise details of construction shown, but instead wish to cover those modifications thereof which will occur to those skilled in the art after learning of my invention, and which are properly within the scope of my invention, as described in the appended claim.

I claim:

An irrigation sock clamp for clamping an irrigation sock in position adjacent an opening in an irrigation pipe comprising a resilient element having an arcuate portion conforming to the circumferential configuration of said irrigation pipe and engaging said pipe above said opening, an extension portion projecting outwardly from one end of said arcuate portion, a single open turn oblong ring portion at the end of said extension portion for receiving and supporting said irrigation sock in spaced relationship to the opening in said irrigation pipe, said oblong ring portion being disposed at an angle to the vertical to prevent folding of the irrigation sock, a handle portion extending upwardly from the other end of said arcuate portion, and a leg portion depending from said handle portion to a point on said irrigation pipe generally diametrically opposite to said oblong ring portion, the lower end of said leg portion terminating in a tip bent outwardly from said irrigation pipe to cam readily over the surface of said pipe during installation and removal.

References Cited by the Examiner

UNITED STATES PATENTS

| | | | |
|---|---|---|---|
| 2,940,777 | 6/1960 | Lundberg | 285—5 |
| 3,050,801 | 8/1962 | Downey | 24—81 |
| 3,233,627 | 2/1966 | Gebula | 137—561 |

FOREIGN PATENTS 719,536  12/1954  Great Britain.

WILLIAM FELDMAN, *Primary Examiner.*
OTHELL M. SIMPSON, *Examiner.*